(No Model.) 6 Sheets—Sheet 1.
W. A. LAIDLAW.
MACHINE FOR MAKING BALE TIES.
No. 473,321. Patented Apr. 19, 1892.
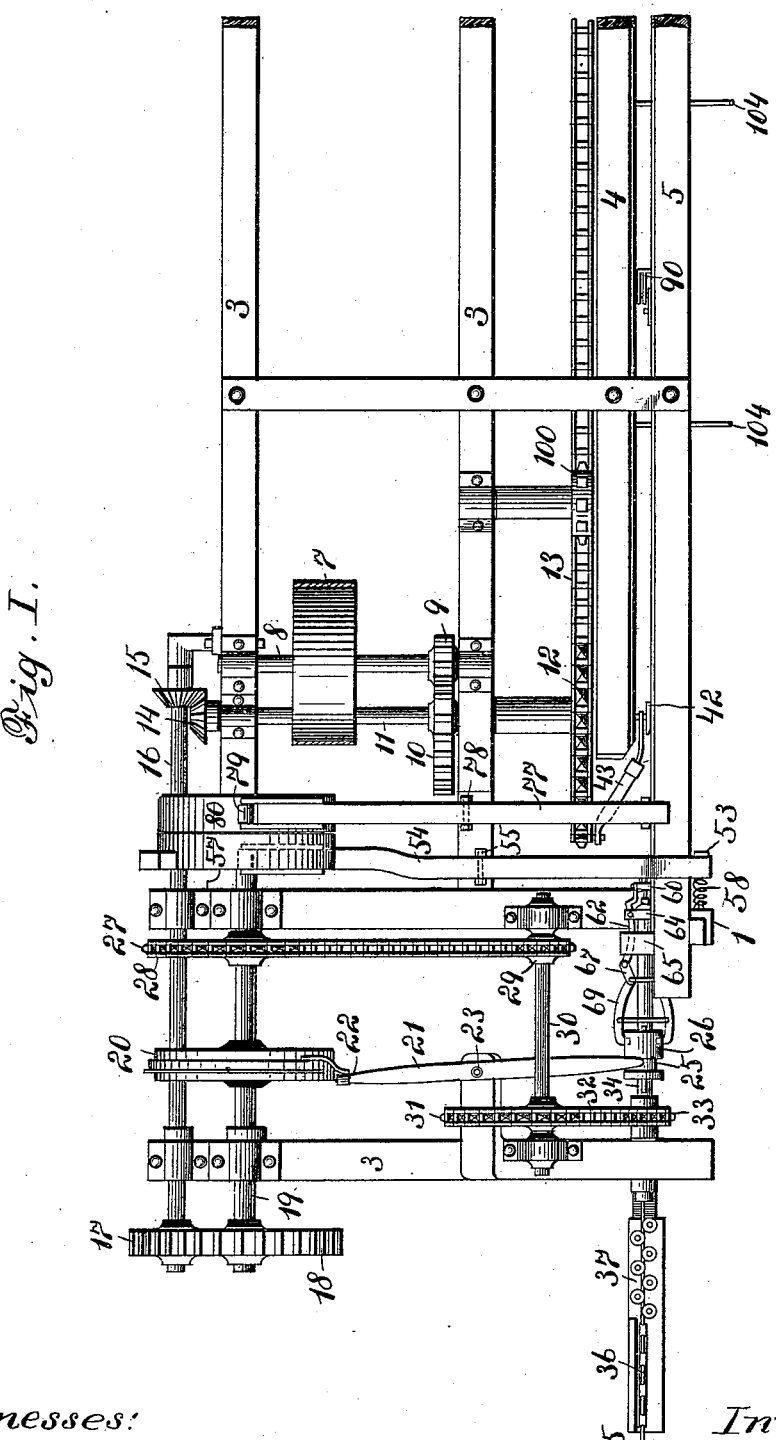
Fig. I.
Witnesses:
F. G. Fischer
Edward Knight
Inventor:
W. A. Laidlaw
By Knight Bros.
Attys.

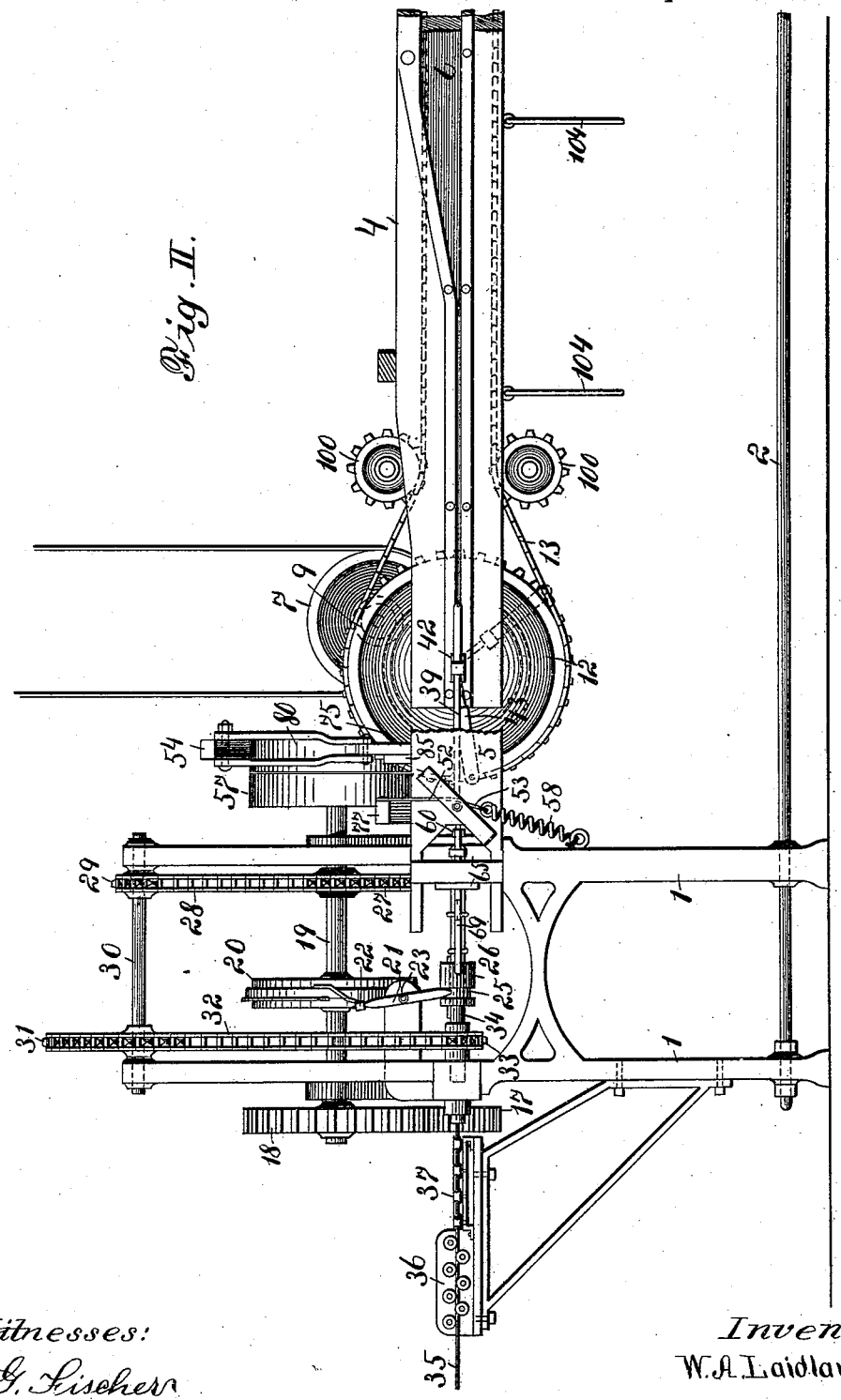

(No Model.) 6 Sheets—Sheet 3.
W. A. LAIDLAW.
MACHINE FOR MAKING BALE TIES.
No. 473,321. Patented Apr. 19, 1892.
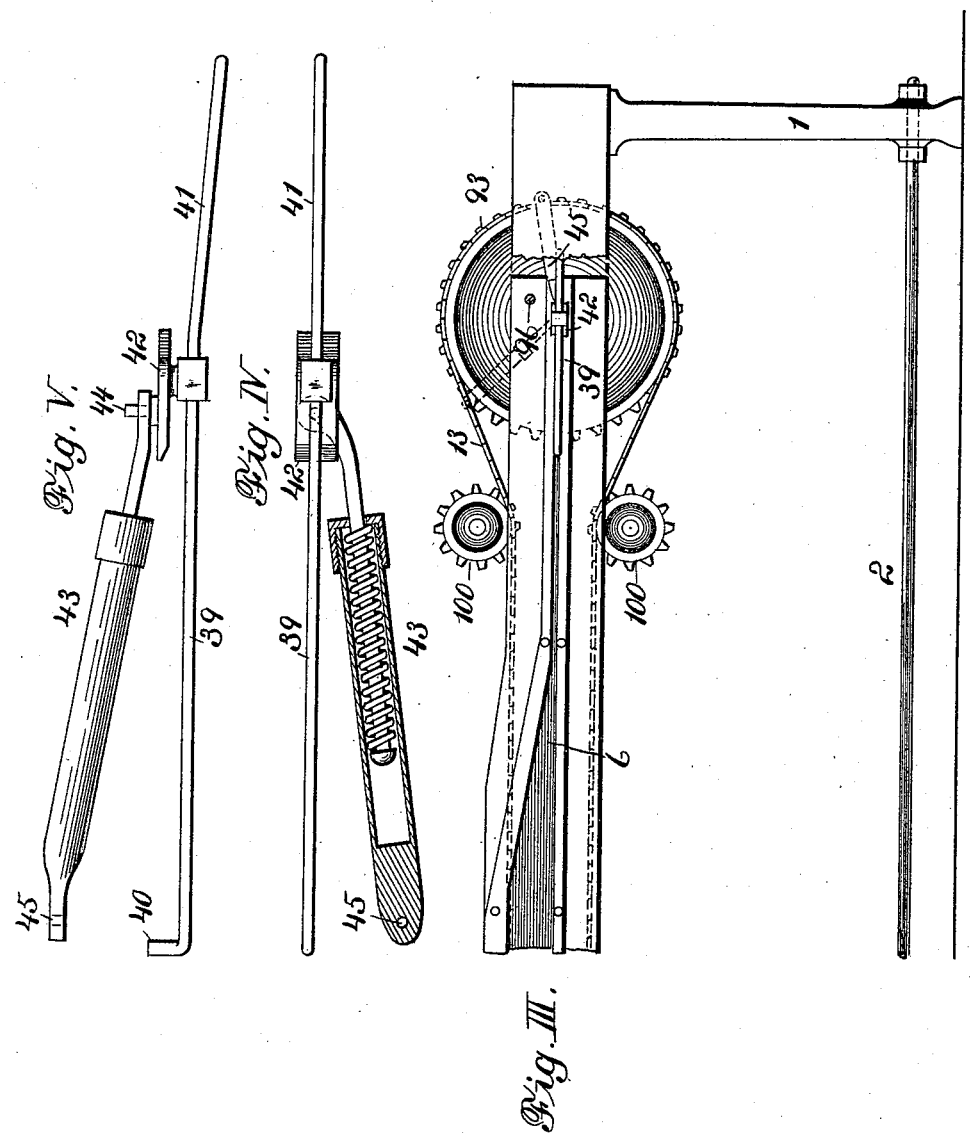
Witnesses:
F. G. Fischer
Edward P. Knight
Inventor:
W. A. Laidlaw
By Knight Bros.
Attys.

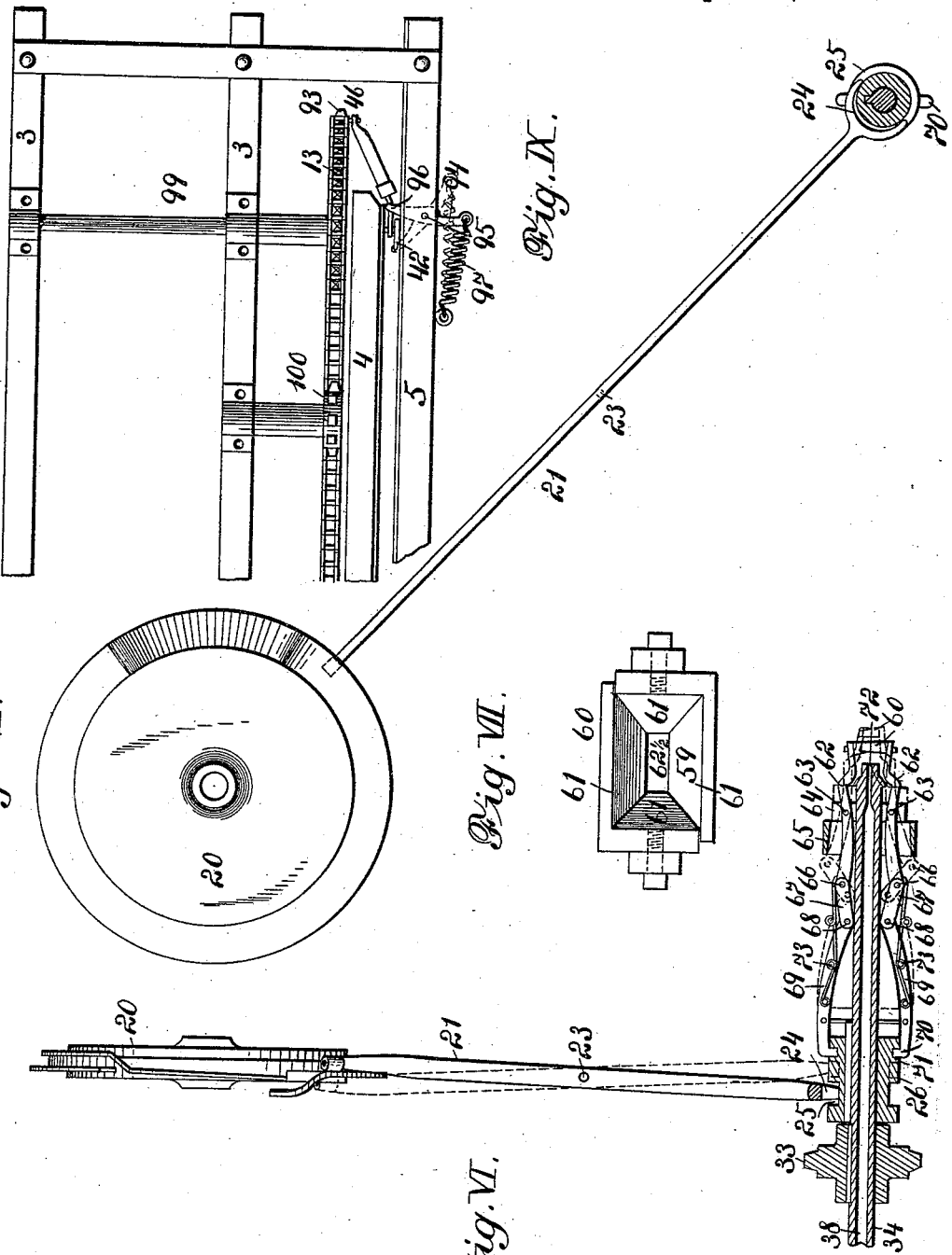

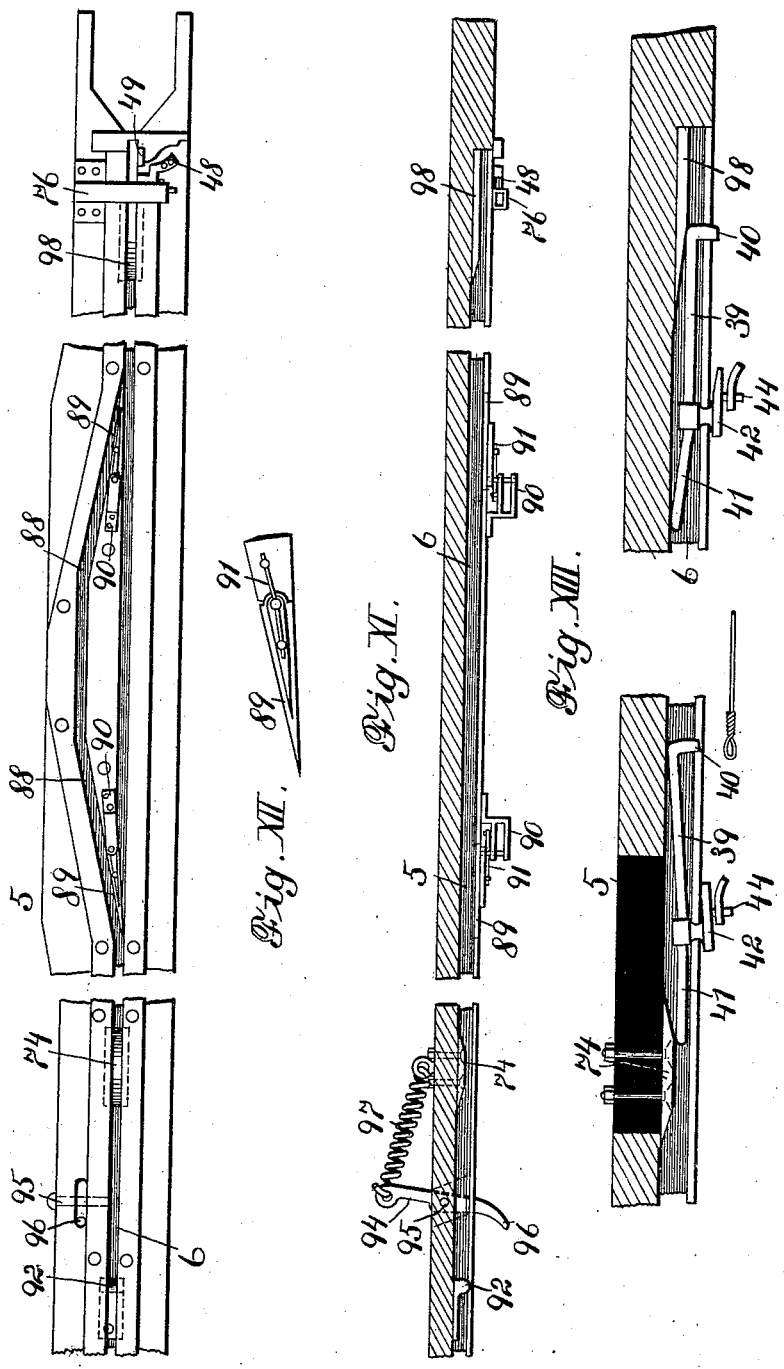

(No Model.) 6 Sheets—Sheet 6.
W. A. LAIDLAW.
MACHINE FOR MAKING BALE TIES.
No. 473,321. Patented Apr. 19, 1892.
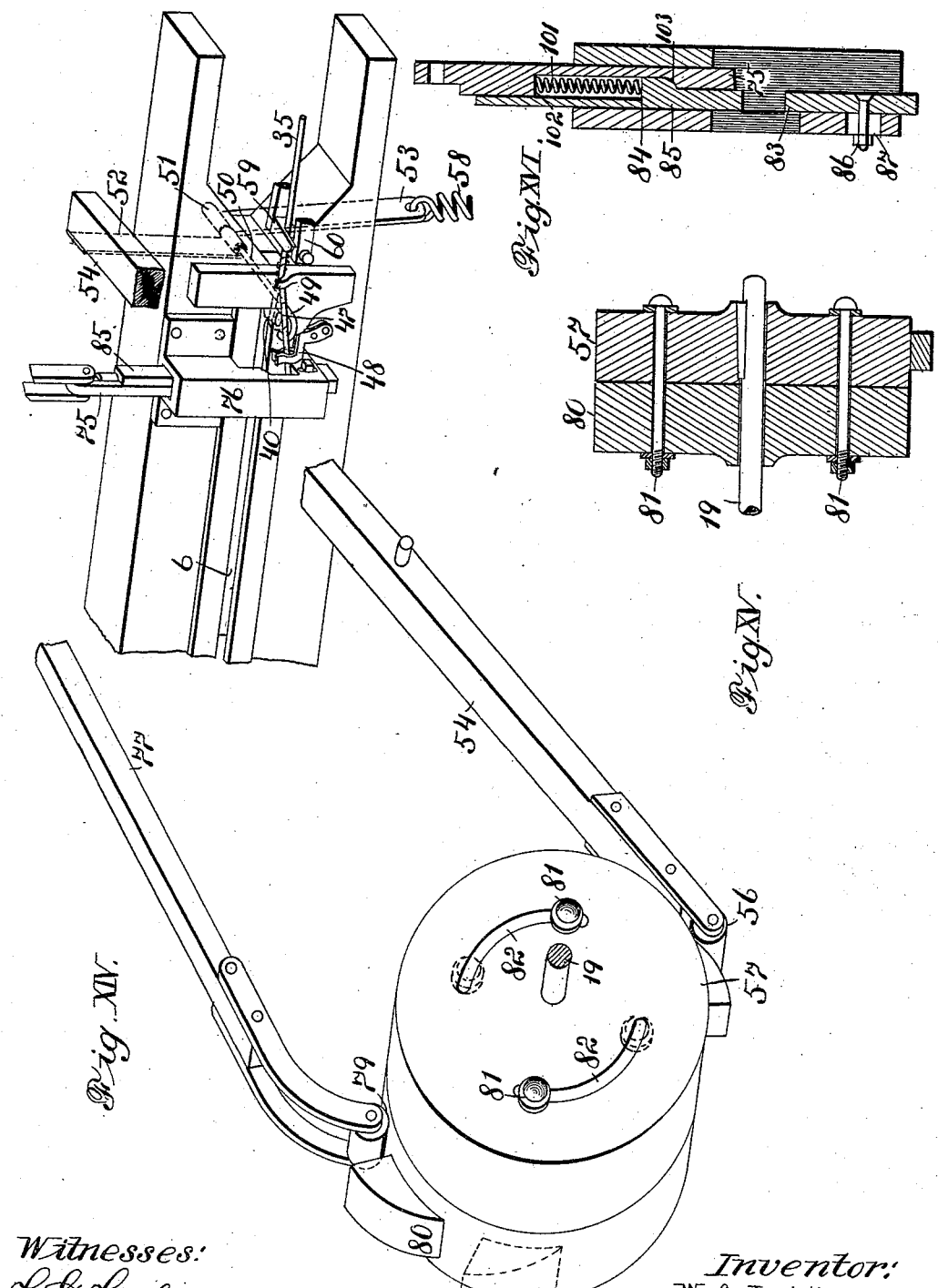
Witnesses:
F. G. Fischer
Edward O. Knight
Inventor:
W. A. Laidlaw
By Knight Bros.
Attys.

UNITED STATES PATENT OFFICE.

WILLIAM A. LAIDLAW, OF CHEROKEE, KANSAS.

MACHINE FOR MAKING BALE-TIES.

SPECIFICATION forming part of Letters Patent No. 473,321, dated April 19, 1892.

Application filed June 1, 1891. Serial No. 394,732. (No model.)

*To all whom it may concern:*

Be it known that I, WILLIAM A. LAIDLAW, of Cherokee, in the county of Crawford and State of Kansas, have invented certain new and useful Improvements in Machines for Making Bale-Ties, of which the following is a full, clear, and exact description, reference being had to the accompanying drawings, which form a part of this specification.

My invention relates to certain new and useful improvements for the manufacture of wire bale-ties; and it consists in certain features of novelty hereinafter described, and pointed out in the claims.

Figure I is a plan view of the principal portion of my device. Fig. II is a side elevation of the same. Fig. III represents the continuation of Fig. II, showing the rear end of my device in side elevation. Fig. IV is an edge view of the loop-carrier, showing means for connecting the same with an endless chain, in section. Fig. V is a plan view of the loop-carrier. Fig. VI is a horizontal section of the twisting device, showing lever and cam for operating the same. Fig. VII represents a plan view of the forward end of the twisting device. Fig. VIII represents a side elevation of cam for operating the twisting device and lever for connecting the cam with said twisting device. Fig. IX is a plan view representing a part of the rear end of my machine. Fig. X is an enlarged detail view of the frame in which the loop-carrier operates. Fig. XI is a side elevation of the same. Fig. XII is an enlarged detail view of one of the switches in said frame. Fig. XIII is an enlarged detail view of the loop-carrier frame. Fig. XIV is an enlarged detail perspective of the looping device, showing cam for operating same. Fig. XV represents a transverse section of the cam for operating the looper and cutting device. Fig. XVI is a vertical section of the cutting device.

Referring to the drawings, 1 represents the legs or supports for supporting the various portions of my device, said legs being connected near their lower ends by brace-rods 2.

3 represents the frame, supported by the legs 1.

4 5 represent two parallel bars, having their inner faces provided with grooves 6, in which the loop-carriers travel.

7 represents the power-pulley, mounted on a shaft 8, said shaft being journaled in the frame 3. Near one end of said shaft 8 is located a pinion 9, which meshes with the gear 10, which in turn is secured to a parallel shaft 11.

12 represents a sprocket-wheel operating a drive-chain 13, the links of which engage said sprocket-wheel, said chain operating the loop-carriers. On the opposite end of the shaft 11 is a beveled gear 14, which meshes with a beveled gear 15, located near one end of a shaft 16. On the opposite end of the shaft 16 is a pinion 17, which meshes with a gear 18 on a parallel shaft 19.

20 represents a cam-wheel mounted on the shaft 19, said cam-wheel serving to reciprocate the twisting device by means of a lever 21, having its outer end provided with a roller 22, which engages said cam, and being fulcrumed to the frame 3, as shown at 23, the inner end of said lever being forked or bifurcated, as shown at 24, said forked end engaging in a groove 25 in a sleeve 26, said sleeve forming a portion of the twisting device.

27 represents a sprocket-wheel on shaft 19. 28 represents a drive-chain engaging said sprocket-wheel and also engaging a smaller sprocket-wheel 29, located on the shaft 30.

31 represents a sprocket-wheel located near the opposite end of the shaft 30, said sprocket-wheel carrying a drive-chain 32, said drive-chain also engaging a sprocket-wheel 33 on the twister-shaft 34.

35 represents the wire, which, as it is unwound from the coil, passes between straightening-rollers 36 37, and thence through the twisting-shaft 34, which is provided with a central opening 38 for this purpose.

My loop-carriers, of which there are two, consist of rods 39, having hooks 40 on one of their ends and having extensions 41 on the opposite ends bent at an angle to the main portion of the rod. 42 represents brackets secured to said rods, and 43 spring-links pivoted to pins 44 on said brackets. 45 represents openings in the opposite ends of said links, by which means the links are connected with the drive-chain 13, as shown at 46, said links drawing the loop-carrier rods 39 back and forth between the bars 4 and 5, the rods and a portion of the brackets traveling in the groove 6 in said bars. When one of the rods 39 has been forced to the forward end of the machine, (see Figs. II and XIV,) the hook 40 extends out of one of the grooves 6 over the end of the wire 35, as shown at 47, the end of said wire at this time being held down out of line of the hook 40 by means of a spring-clamp 48, said wire at this time resting on the hook-shaped looper 49.

50 represents the looper-shaft, which is journaled to the frame, as shown at 51.

52 53 represent straps, a portion of which are wound around the looper-shaft 50. The opposite end of the strap 52 is connected to a lever 54, fulcrumed at 55 to the frame and having a roller 56 on its opposite end in the path of a cam-wheel 57, said cam-wheel on each revolution depressing said lever 54, drawing upward on the strap 52, thus partially rotating the looper 49 (see Fig. XIV) and forming a loop at the end 48 of the wire 35, around the hook 40, preparatory to its being twisted. After said loop has been formed and the cam-wheel 57 releases the lever 54 the strap 53, to which is secured a spring 58, will return said looper to its original position preparatory to forming the next loop. After said loop has been formed around the hook 40 the twisting device is forced forward by means of the lever 21, operated by the cam 20, until the adjustable jaws 59 60 on the end of said twister extend over said loop, (see dotted lines, Fig. VI,) seizing the end of the wire and holding it in close contact with the body of the same until the end of the wire has been thoroughly twisted around the body of the wire, thereby forming the loop. The jaws 59 60 are provided with beveled faces 61 for guiding the wire and are provided with a central opening 62½, through which the end of the wire may extend, it being understood that the body of the wire always extends through this opening in its passage to the looper. The jaws 59 60 are secured to the ends of toggle-levers 62, said levers being pivoted at 63 to a plate 64 and operating in a bearing 65. The opposite ends of said toggle-levers are pivoted at 66 to links 67, said links being pivoted at their opposite ends, as shown at 68, to the forward ends of toggle-levers 69, thus forming a compound toggle. The opposite ends of the toggle-levers 69 are made hook-shaped, as shown at 70, and engage in an opening 71 in the sliding sleeve 26. As the toggle or twisting device travels forward by the action of the lever 21, operated by the cam 20, pressing the sleeve 26 forward, the toggles, links, and jaws will be forced into the position shown in dotted lines, Fig. VI, thus causing the jaws on the end of the toggle to contract and grasp the end of the wire, holding it in close contact with the body of the wire as the twisting operation is performed, the twister or toggles being limited in their forward movement by the shoulder 72 on the forward end of the twisting-shaft 34, the plate 64, to which the forward toggles are pivoted, coming in contact with said shoulder. As the jaws on the end of the toggle grasp the wire, the same is twisted by the rotation of the twister-shaft 34, said shaft being rotated by the sprocket-chain 32 on the sprocket-wheel 33. After the twist has been formed the twisting device is forced backward from the same by means of the cam 20, operating on the lever 21, causing said lever to force the sliding sleeve 26 from the position shown in Fig. I and in dotted lines, Fig. VI, to the position shown in full lines, Fig. VI. As the sleeve 26 is forced backward, drawing with it the compound toggle, springs 73 on the portions 69 of the toggle will force the forward ends of the toggle from the position shown in dotted lines, Fig. VI, to the position shown in full lines in said figure, thus opening the jaws on the end of the toggle in order to release the twisted loop, this reciprocating motion of the twister being continuous while the machine is operated. While the loop and twist in the bale-tie are being formed, the rod 39 and its hook 40 remain stationary for a period, while the outer end of the link 43 is passing a portion of the way around the sprocket-wheel 12, the sprocket-wheel 12 being of sufficient size to permit the rod 39 to remain stationary a sufficient length of time for the loop and twist to be formed. After the twist has been formed and the link 43 on the drive-chain 13 has passed from the position shown in full lines, Fig. II, to substantially the position shown in dotted lines in the same figure the said link will begin to move the rod 39 back toward the rear end of the machine, drawing with it the wire with the loop which has just been formed to the rear end of the machine, said rod traveling in the groove 6 in the bars 4 5. When the rod 39 has reached the end of the machine or the position shown in Fig. III, the bent end 41 of the same will come in contact with an adjustable wedge 74, located in the groove 6 in the bar 5, (see Fig. XIII,) said wedge forcing the end 41 outward, and consequently forcing the hook 40 inward beyond the outer line of the bar, said bar forcing the loop of wire off of said hook 40, from which the completed bale-tie drops from the machine preparatory to being bundled.

About the time that the tie is being cast from the machine the opposite end thereof is severed from the body of the wire, as will now be described. The wire is severed by a cutter 75, which works vertically in a grooved frame 76. The cutter 75 is depressed by a lever 77, fulcrumed to the frame at 78. On the opposite end of said lever is a roller 79, with which a cam-wheel 80 comes in contact at intervals. Said cam-wheel 80 and the cam-wheel 57 for operating the looping device are connected to each other by bolts 81, working in semi-circular slots 82, which permit of adjustment of the cam-wheel 80, in order to make the cutting device operate at an earlier or later period, the purpose of which is to make a longer or a shorter tie by severing the wire sooner or later. At the time that the cutter 75 is forced downward, shearing off the wire against a stop 83, said cutter, after having severed the wire, comes in contact with a shoulder 84 on a presser-foot 85, pressing the same down against the stop 83, thus grasping the end of the body of the wire which has been severed and holding the same from springing backward, and at the same time pressing the end of the wire down into the clamp 48, out of the path of the returning-hook 40. The foot 83 is made adjustable by means of a bolt 86, working in a slot 87 in the grooved frame 76. As one of the rods 39 is traveling backward with the wire, the opposite rod 39 is traveling forward into position to have a new loop formed thereon. As said rods travel between the same bars, it is necessary that some means should be provided for them to pass each other, which they do at about the center of said bars. This is accomplished by a switch-groove 88 in the bar 5, a spring-switch 89 being located at the entrance of said groove for guiding the returning rod into said groove 88, and permitting the opposite rod to pass through on the straight groove 6. (See Fig. X). The opposite end of said groove 88 is also provided with a switch 89, which prevents the rod which travels in the groove 6 from passing into the switch-groove 88. The switches 89 are pivoted to brackets 90, and are provided with springs 91 for holding them in their proper position. As the rod 39 arrives at the rear end of the machine, as shown in Fig. III, and the bale-tie is discharged, the end of said rod will come in contact with the stop 92, which limits its backward movement, and as the link 43 is a spring-link said link will adapt itself to the stoppage of said rod and will not cause strain on the same. When the link has reached this point, it will travel, with the drive-chain 13, around to the sprocket-wheel 93, turning completely over on the pin 44 into the position shown in Fig. V, preparatory to returning the rod 39 back to the forward end of the machine to receive another loop.

94 represents a lever fulcrumed to the bar 5, as shown at 95, said lever having its end 96 extending out in the path of the link 43, the object of said lever being to hold said link at the backward end of the machine until said link has passed around the sprocket-wheel 93, the rod 39 being thus held at the extreme backward limit until the link has turned over and is ready to draw the same to the forward end. After the link has turned over the pressure on the same by the drive-chain 13 will cause the lever 94 to be pressed backward into the position shown in dotted lines, Fig. IX, thus releasing said link. The lever 94 then flies back to its normal position, into which position it is forced by a spring 97, secured thereto. As the rod 39 is being carried forward ready to receive a new loop, the hook 40 passes along entirely within the groove 6, and as it approaches the opposite end of said groove it is forced outward by a wedge 98, located therein in order that the hook will be in position to receive a new loop. The sprocket-wheel 93 is located on one end of a shaft 99, journaled to the frame 3.

100 represents bearing sprocket-wheels in the path of the drive-chain 13, which cause the drive-chain to travel parallel with the frame 4.

101 represents a spring located between the shoulder 84 on the presser-foot 85 and a shoulder 102 on the cutter 75, said spring being for the purpose of returning said cutter to its normal position. As the cutter rises it comes in contact with a shoulder 103 on the presser-foot 85, and raises it to the position shown in Fig. XVI.

104 represents hooks onto which the completed ties are cast.

I claim as my invention—

1. The combination of rods 39, working in a grooved frame, hooks on the end of said rods, around which the loop is formed, means for forming said loop, a twisting device, and a drive-chain with which said rods are connected for reciprocating the same, substantially as set forth.

2. In a machine for making bale-ties, the combination of the grooved bars, the rods 39, operating in said grooved bars and provided with hooks 40, around which the loops are formed, a drive-chain supported adjacent to said grooved bars, means for operating said drive-chain, means for connecting said rods 39 with said drive-chain, and a suitable twisting device and a cutting device arranged in proper working relation at the forward end of the grooved bars, substantially as and for the purpose set forth.

3. In a machine for making bale-ties, the combination of the grooved frame, rods for carrying wire reciprocating in said grooved frame, a drive-chain supported in said frame, means for operating said drive-chain, spring-links connecting said wire-carrying rods with said drive-chains, and a suitable twisting device and a cutting device supported in proper working relation at the forward end of said frame, substantially as herein set forth.

4. The combination of a guiding-frame, rods 39, reciprocating in the same, hooks 40 on said rods, brackets 42, secured to said rods, links 43, pivoted to said brackets, drive-chains with which said links are connected, a twisting device, and a cutting device, substantially as described, and for the purpose set forth.

5. The combination of a guide-frame, rods 39, reciprocating therein and having hooks 40 thereon at one end, bent portions 41 on said rods at the opposite ends, means for connecting said rods with the drive-chain, and a spring-lever 94, located in said guide-frame in the path of said rods 39, substantially as and for the purpose set forth.

6. The combination of a grooved guide-frame, rods 39, having one end operating in the same, hook 40 on said rods, an extension 41 on said rods at the opposite end, links 43, connecting said rods with the drive-chain, and wedges 74 and 98, arranged in said grooved guide-frame for throwing the hook 40 in and out of said grooved frame, substantially as and for the purpose set forth.

7. The combination of the grooved frame, rods 39, traveling therein, hooks on said rods, a drive-chain, links 43, connecting said rods with said drive-chain, a switch-groove in said guide-frame, and switches in connection with said groove, substantially as and for the purpose set forth.

8. The combination of the bars 4 and 5, having grooves 6 therein, rods 39, having hooks thereon and traveling in said grooves, means for reciprocating said rods, a switch-groove 88, switches 89, located at the ends of said grooves 88, and a spring 91 on said switches for holding them in their normal position, substantially as described, and for the purpose set forth.

9. The combination of the bars 4 and 5, having grooves therein, carrier-rods 39, adapted to reciprocate in said grooves, and hook 40 on the same at one end, a drive-chain, links 43 for connecting said carrier-rods with the drive-chain, and suitable sprocket-wheels for operating said drive-chain, substantially as and for the purpose set forth.

10. The combination of guide-bars, reciprocating carriers operating in the same, a looper 49, having a shaft 50, straps 52 and 53 on said shaft, a lever 54, connected with the strap 52, means for rocking said lever in order to partially rotate said looper-shaft, and a twisting device for twisting the wire after said loop has been formed, substantially as and for the purpose set forth.

11. The combination of guide-bars having reciprocating loop-carriers operating therein, a looper 49, having a shaft 50, a strap 52 on said looper-shaft, a lever 54, connected with said strap, and a cam 57 for rocking said lever in order to partially rotate said looper-shaft, substantially as described, and for the purpose set forth.

12. The combination of guide-bars, reciprocating loop-carriers operating therein, a looper 49, having a shaft 50, straps 52 and 53, wound on said looper-shafts, a lever 54, connected with the strap 52, a roller 56 on said lever, a cam 57 for rocking said lever in order to partially rotate said looper-shaft, and a spring 58, attached to said strap 53 for returning said looper to its normal position, substantially as described, and for the purpose set forth.

13. The combination of the grooved supporting-frame, the reciprocating loop-carrier operating therein, a looper supported at the forward end of said frame, a cutter 75, supported adjacent to said looper, means for depressing said cutter, and a presser-foot 85 in connection with said cutter, whereby the presser-foot will be depressed at the same time with the cutter, substantially as set forth.

14. The combination of guide-bars, reciprocating loop-carriers operating therein, a looper, a cutter 75, means for depressing the same, a presser-foot 85, having a shoulder 84, a shoulder 102 on said cutter, a spring 101, interposed between said shoulders, and a stop 83, with which said presser-foot comes in contact and against which the cutter 75 cuts the wire passing over said stop, substantially as and for the purpose set forth.

15. The combination of guide-bars, reciprocating loop-carriers operating therein, a looper, a lever 54 for operating said looper, a cam 57 for rocking said lever, a cutter 75, a lever 77 for operating said cutter, and a cam 80 for operating said lever, said cam 80 being adjustable with respect to the cam 57 by means of bolts 81, and semicircular slots 82, substantially as described, and for the purpose set forth.

16. The combination of guide-bars, reciprocating loop-carriers operating in the same, a looper, a cutter 75, means for operating the same, a presser-foot 85, an adjustable stop 83, and a clamp 48 for holding the end of the wire after it has been pressed down by the presser-foot 85, substantially as and for the purpose set forth.

17. The combination of a loop-carrier, a looping device, a cutting device, and a reciprocating twisting device, said twisting device consisting of a shaft 34, sliding sleeve on said shaft, a compound toggle in connection with said sleeve, and jaws on the end of said toggle for receiving the wire loop, substantially as described, and for the purpose set forth.

18. The combination of a loop-carrier, a looping device, a cutting device, and a reciprocating twisting device, said twisting device being formed of a shaft 34, having a central opening 38 for the passage of wire, a movable sleeve 26, working on said shaft, a compound toggle, consisting of portions 69 and 62, connected with links 67, and movable jaws 59 and 60 on the ends of said toggle, substantially as described, and for the purpose set forth.

19. In a machine for making bale-ties, a twisting device consisting of a central shaft 34, having a central passage 38, a movable sleeve 26 on said shaft, a compound toggle consisting of portions 69 and 62, connected with links 67, movable jaws 59 and 60 on the portion 62 of the toggle, plates 64, to which the parts 62 are pivoted, a stop 72 near the forward end of said shaft 34, with which said plate 64 comes in contact, a bearing 65, and a spring 73, connecting said toggles for returning the same to their normal position after the loop has been twisted, substantially as and for the purpose set forth.

WILLIAM A. LAIDLAW.

Witnesses:
E. A. PERRY,
R. N. KEMP.